April 18, 1961   L. J. KAPOSTA   2,979,878
ROTARY MOWER FOR PRODUCING SCALLOPED CUTTING EFFECT
Filed May 20, 1960   3 Sheets-Sheet 1

INVENTOR.
LOUIS J. KAPOSTA,
BY
McMorrow, Berman & Davidson
ATTORNEYS.

April 18, 1961 L. J. KAPOSTA 2,979,878
ROTARY MOWER FOR PRODUCING SCALLOPED CUTTING EFFECT
Filed May 20, 1960 3 Sheets-Sheet 2
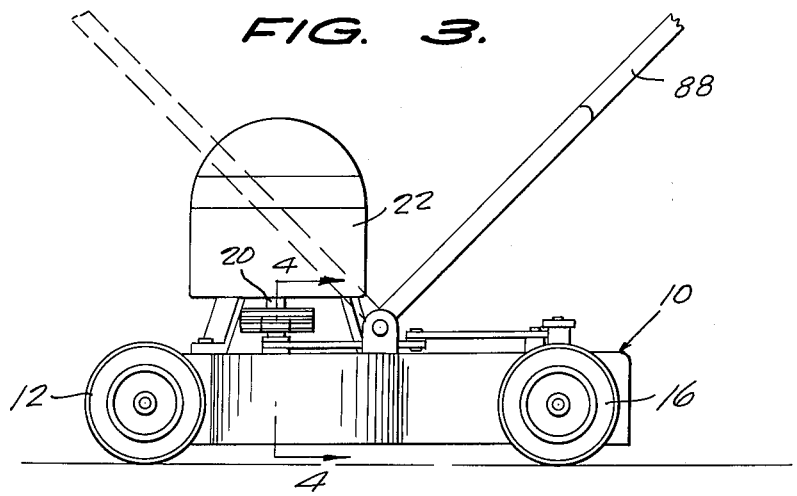
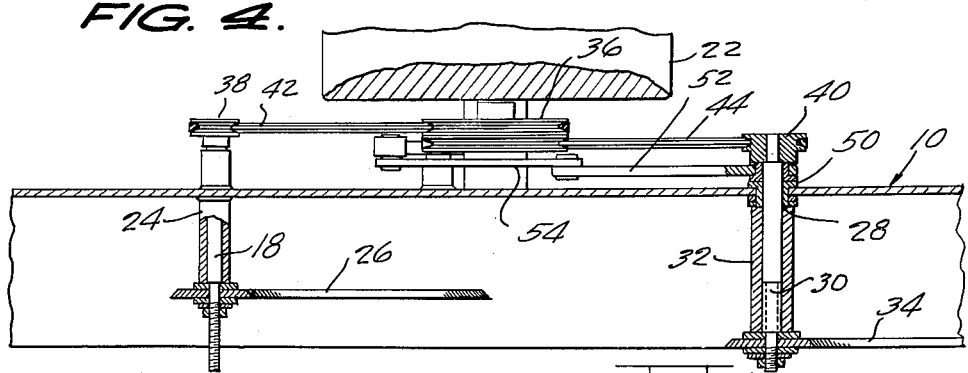
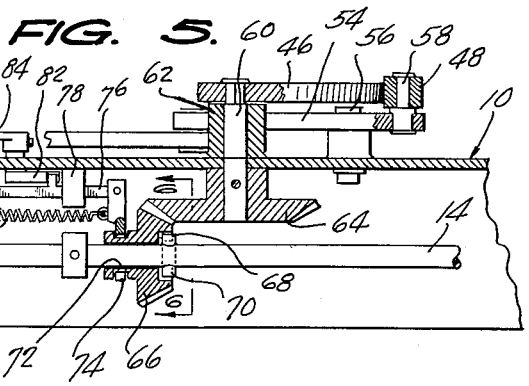
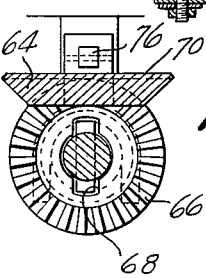
INVENTOR.
LOUIS J. KAPOSTA,
BY
McMorrow, Berman & Davidson
ATTORNEYS.

April 18, 1961    L. J. KAPOSTA    2,979,878
ROTARY MOWER FOR PRODUCING SCALLOPED CUTTING EFFECT
Filed May 20, 1960    3 Sheets-Sheet 3
FIG. 7.
FIG. 9.
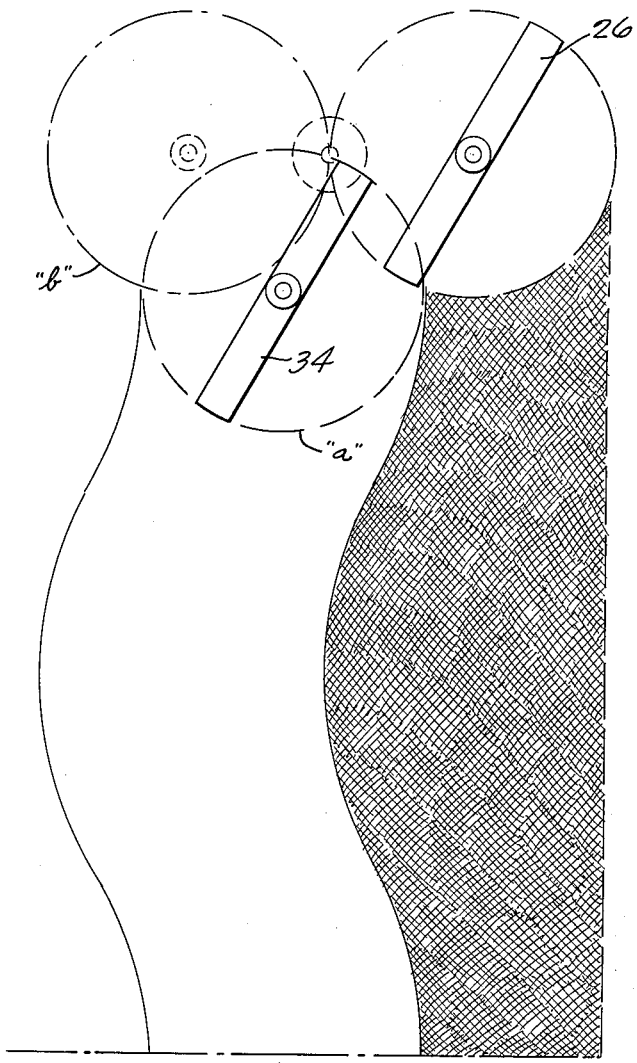
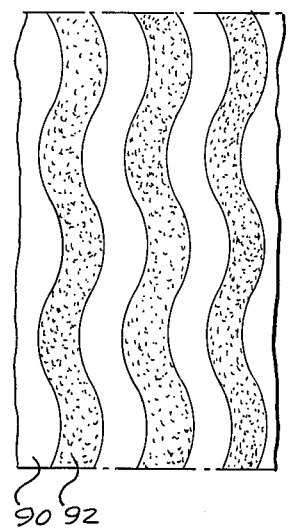
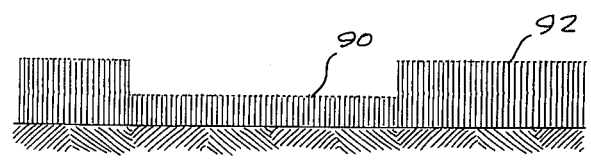
FIG. 8.
INVENTOR.
LOUIS J. KAPOSTA,
BY
McMorrow, Berman & Davidson
ATTORNEYS.

United States Patent Office 2,979,878
Patented Apr. 18, 1961

2,979,878

ROTARY MOWER FOR PRODUCING SCALLOPED CUTTING EFFECT

Louis J. Kaposta, W2936 Litchfield St., Spokane, Wash.

Filed May 20, 1960, Ser. No. 30,505

5 Claims. (Cl. 56—25.4)

The present invention relates to lawn mowers generally and in particular to a rotary mower of the dual blade type.

An object of the present invention is to provide a rotary mower having means for producing a scalloped or sculptured effect in a lawn area.

Another object of the present invention is to provide a rotary mower having means for producing a scalloped or sculptured effect in a lawn area, which means is with ease and facility shifted between operative and inoperative positions.

A further object of the present invention is to provide a rotary mower of simple structure, one having few parts requiring little or no maintenance or replacement, and one which is economically feasible.

These and other objects and advantages of the present invention will be fully apparent from the following description when taken in conjunction with the annexed drawings, in which:

Figure 3 is an elevational view of the mower, as shown from the side;

Figure 4 is a view on an enlarged scale, taken on the line 4—4 of Figure 3;

Figure 5 is a view on an enlarged scale, taken on the line 5—5 of Figure 1;

Figure 6 is a view on an enlarged scale, taken on the line 6—6 of Figure 5;

Figure 7 is a schematic view showing how a scalloped or sculptured effect is produced on a lawn surface, using the mower of the present invention;

Figure 8 is a view in section of the lawn area of Figure 7; and,

Figure 9 is a view on a reduced scale of a large area of lawn sculptured or scalloped by the mower of the present invention.

Figure 1:
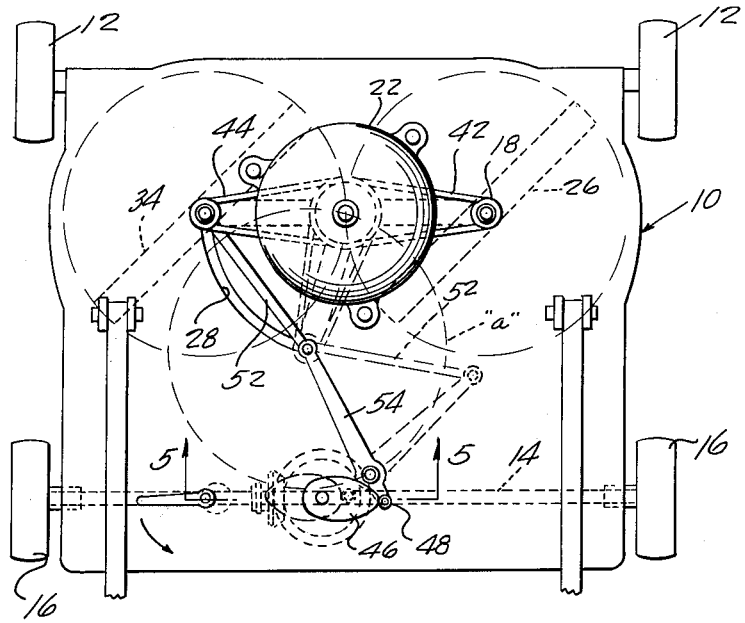
Figure 1 is a top plan view of the mower according to the present invention, the dotted line showings indicating the phantom positions of the blades on the mower.
Figure 2:
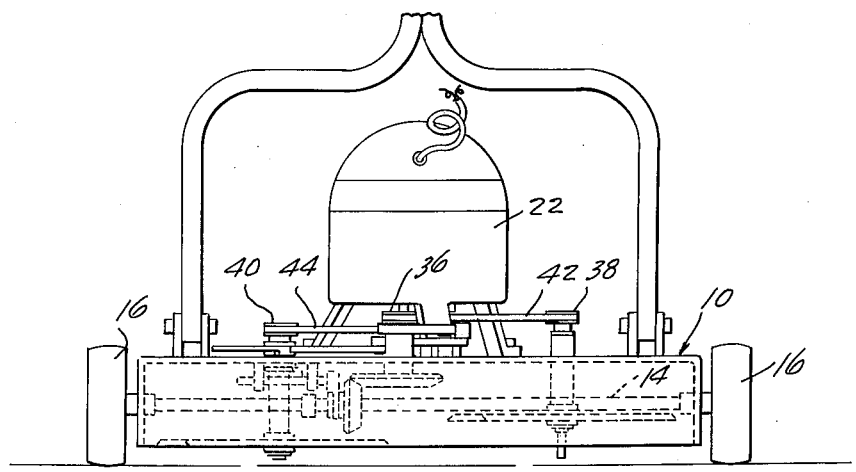
Figure 2 is an elevational view of the mower, as shown from the rear.

Referring in greater detail to the drawings, in which like numerals indicate like parts throughout the several views, the rotary mower of the present invention comprises a hollow shell or frame 10 having a pair of wheels 12 at the forward end mounted on the frame 10 for rotation, and having a wheel driven axle 14 extending transversely across the rearward end and supported upon wheels 16.

A first vertically disposed driven shaft 18 is positioned on one side of and spaced from a vertically disposed drive shaft 20 projecting downwardly from a motor housing 22, the motor housing 22 being supported upon the frame 10.

The shaft 18 is journalled in a sleeve 24 which is fixedly secured in the frame 10 and has a portion extending above the frame 10, as shown most clearly in Figure 4.

A horizontally disposed blade 26 is detachably secured to the lower end portion of the shaft 18.

The top of the frame 10 is provided with an arcuately shaped slot or slideway 28 formed from part of a circle, the center of which is the longitudinal axis of the drive shaft 20.

A second vertically disposed driven shaft 30 is positioned on the side of the drive shaft 20 opposite to the shaft 18 and is spaced from the drive shaft 20.

A sleeve 32 is circumposed about the shaft 30 and is slidable back and forth in the slideway 28 and the sleeve 32 constituting means mounting the shaft 30 in the frame 10 for back and forth movement toward and away from and relative to the shaft 18.

Another horizontally disposed blade 34 is detachably connected to the lower end portion of the shaft 30.

The blade 26 is at a higher level than the blade 34 for a reason to be described later.

Means is provided drivingly connecting the drive shaft 20 to the driven shafts 18 and 30. Specifically, this means consists in a double pulley 36 on the shaft 20, pulleys 38 and 40 on the shafts 18 and 30, respectively, and driven belts 42 and 44 connecting the shaft 20 to the shaft 18 and shafts 30, respectively.

Means is provided drivingly connecting the axle 14 to the mounting means of the shaft 30 so that the shaft 30 executes its back and forth movement responsive to driven movement of the axle 14 when the frame 10 is propelled over a lawn area. Specifically, this means consists in a cam 46 drivingly connected to the axle 14, a cam follower 48 drivably engaged by the cam 46, and means connecting the cam follower 48 to the shaft 30 so that the shaft 30 executes back and forth movement responsive to rotation of the axle 14.

The upper end portion of the sleeve 32 carries a bushing 50 (Figure 4) to which is pivotally connected one end of an arm 52. The other end of the arm 52 is pivotally connected to one end of a lever 54 which is connected intermediate its ends by a pivot pin 56 to the top of the frame 10.

The cam follower 48 is mounted upon the other end of the lever 54 by means of a pivot pin 58. The cam 46 is mounted upon the upper end of a vertically disposed shaft 60 journalled in a bushing 62 formed integrally with the top of the frame 10, as shown in Figure 5.

A portion of the shaft 60 adjacent the lower projects below the frame 10 and is fixedly secured to a bevel gear 64. The bevel gear 64 is in mesh with another bevel gear 66 slidably mounted on the axle 14 and movable, in a clutch arrangement, between the position in which it is in mesh with the gear 64 and a position in which it is out of mesh with the gear 64. The hub of the gear 66 is provided with a transverse slot 68 which receives a cross pin 70 carried by the shaft 14, as shown in Figures 5 and 6.

The hub of the gear 66 is provided with an annular groove 72 in which rides a ring 74 dependingly carried on one end of a slide member 76 slidably mounted on the underside of the frame 10, as shown in Figure 5. The slide member 76 is mounted in blocks 78 and 80 fixed to the underface of the frame 10 and between which is a cam device 82 drivably connected to a handle 84 mounted on top of the frame 10. Rotating the handle 84 in one direction permits a spring 86 to shift the slide member 76 to draw the gear 66 out of engagement with the gear 64, and turning the handle 84 in the opposite direction moves it to the position shown in Figure 5 in which the gear 66 is in mesh with the gear 64.

In use, the mower of the present invention is propelled over the lawn area to be mowed by means of a conventionally arranged handle 88. The resistance to movement of the blade 34 through the grass to be cut tends to swing the shaft 30 to the rearward end of the slideway 28. In this position the path of the extreme end of the blade 34 is shown in dotted lines in Figure 1 and designated by the letter "a."

Upon traveling movement over the ground surface, the wheels 16 drive the axle 14 so that the cam 46 rotates and effects pivotal movement of the lever 54 about a vertical axis so that the arm 52 is extended, as shown in dotted lines in Figure 1. This movement of the arm 52 shifts the shaft 30 back to the forward end of the slot or slideway 28 until the cam 46 executes another cycle of its movement to permit the lever 54 to bring the arm 52 back to the aforesaid position.

Due to the difference in level between the blades 34 and 26, a sculptured effect is obtained in the grass cut, as in Figures 7 to 9, in which the grass cut by the blade 34 is at a lower level, as at 90 in Figure 8, than the grass cut by the blade 26, as at 92.

In Figure 7 the path of travel of the end of the blade 34 is again designated by the letter "a" when the shaft 30 is at one end of the slideway 28 and by the letter "b" when the shaft 30 is at the other end of the slideway 28.

While only a single embodiment of the present invention is shown, other embodiments are contemplated and numerous changes and modifications may be made in the invention without departing from the spirit thereof as set forth in the appended claims.

What is claimed is:

1. In a rotary mower, a frame, a wheel driven axle carried by said frame, a vertically disposed drive shaft supported in said frame, a first vertically disposed driven shaft positioned on one side of and spaced from said drive shaft and journalled in said frame, a second vertically disposed driven shaft positioned on the opposite side of and spaced from said drive shaft, means mounting said second driven shaft in said frame for back and forth movement relative to said first driven shaft, a first horizontally disposed blade connected to said first driven shaft for rotation therewith, a second horizontally disposed blade connected to said second driven shaft for rotation therewith, one of said blades being at a higher level than the other of said blades, means drivingly connecting said drive shaft to said first and second driven shafts, and means drivingly connecting said axle to said second shaft mounting means so that said second driven shaft executes its back and forth movement responsive to driven movement of said axle.

2. In a rotary mower, a frame, a wheel driven axle carried by said frame, a vertically disposed drive shaft supported on said frame, a first vertically disposed driven shaft positioned on one side of and spaced from said drive shaft and journalled in said frame, a second vertically disposed driven shaft positioned on the opposite side of and spaced from said drive shaft, means embodying a horizontally disposed arcuately shaped slideway in a sleeve circumposed about said second shaft and slidable back and forth in said slideway, mounting said second driven shaft in said frame for back and forth movement relative to said first driven shaft, a first horizontally disposed blade connected to said first driven shaft for rotation therewith, a second horizontally disposed blade connected to said second driven shaft for rotation therewith, one of said blades being at a higher level than the other of said blades, means drivingly connecting said drive shaft to said first and second driven shafts, and means drivingly connecting said axle to said sleeve so that said sleeve executes its back and forth movement responsive to driven movement of said axle.

3. In a rotary mower, a frame, a wheel driven axle carried by said frame, a vertically disposed drive shaft supported in said frame, a first vertically disposed driven shaft positioned on one side of and spaced from said drive shaft and journalled in said frame, a second vertically disposed driven shaft positioned on the opposite side of and spaced from said drive shaft, means mounting said second driven shaft in said frame for back and forth movement relative to said first driven shaft, a first horizontally disposed blade connected to said first driven shaft for rotation therewith, a second horizontally disposed blade connected to said second driven shaft for rotation therewith, one of said blades being at a higher level than the other of said blades, means drivingly connecting said drive shaft to said first and second driven shafts, and means including a cam drivingly connected to said axle, a cam follower drivably engaged by said cam, and means connecting said cam follower to said second shaft so that said second shaft executes its back and forth movement responsive to driven movement of said axle.

4. In a rotary mower, a frame, a wheel driven axle carried by said frame, a vertically disposed drive shaft supported in said frame, a first vertically disposed driven shaft positioned on one side of and spaced from said drive shaft and journalled in said frame, a second vertically disposed driven shaft positioned on the opposite side of and spaced from said drive shaft, means embodying a horizontally disposed arcuately shaped slideway in a sleeve circumposed on said second shaft and slidable back and forth in said slideway mounting said second driven shaft in said frame for back and forth movement relative to said first driven shaft, a first horizontally disposed blade connected to said first driven shaft for rotation therewith, a second horizontally disposed blade connected to said second driven shaft for rotation therewith, one of said blades being at a higher level than the other of said blades, means drivingly connecting said drive shaft to said first and second driven shafts, a cam drivingly connected to said axle, a cam follower engaging said cam, and means connecting said cam follower to said sleeve so that said sleeve executes its back and forth movement responsive to driven movement of said axle.

5. In a rotary mower, a frame, a wheel driven axle carried by said frame, a vertically disposed drive shaft supported in said frame, a first vertically disposed driven shaft positioned on one side of and spaced from said drive shaft and journalled in said frame, a second vertically disposed driven shaft positioned on the opposite side of and spaced from said drive shaft, means embodying a horizontally disposed arcuately shaped slideway and a sleeve circumposed about said second shaft and slidable back and forth in said slideway mounting said second driven shaft in said frame for back and forth movement relative to said first driven shaft, a first horizontally disposed blade connected to said first driven shaft for rotation therewith, a second horizontally disposed blade connected to said second driven shaft for rotation therewith, one of said blades being at a higher level than the other of said blades, means drivingly connecting said drive shaft to said first and second driven shafts, a cam drivingly connected to said axle, an arm having one end pivotally connected to said sleeve, a lever having one end pivotally connected to the other end of said arm mounted intermediate the ends thereof on said frame for pivotal movement about a vertical axis, and a cam follower on the other end of said lever drivingly engaging said cam, said cam and cam follower, responsive to execution of movement of said axle, effecting pivotal movement of said lever about said axis to cause back and forth movement of said sleeve in said slideway and movement of said second driven shaft relative to said first driven shaft.

No references cited.